US010287217B2

(12) United States Patent
Lee et al.

(10) Patent No.: US 10,287,217 B2
(45) Date of Patent: May 14, 2019

(54) METHOD FOR MANUFACTURING SUSTAINED-RELEASE MATRIX-TYPE GRANULAR COMPLEX FERTILIZER AND MATRIX-TYPE GRANULAR COMPLEX FERTILIZER OBTAINED THEREFROM

(71) Applicant: Leaders Chemical Co., Ltd., Seoul (KR)

(72) Inventors: Sung Jin Lee, Seoul (KR); Hyun Jong Cho, Gyeongsangbuk-do (KR)

(73) Assignee: LEADERS CHEMICAL CO., LTD., Seoul (KR)

( * ) Notice: Subject to any disclaimer, the term of this patent is extended or adjusted under 35 U.S.C. 154(b) by 240 days.

(21) Appl. No.: 14/892,805

(22) PCT Filed: Oct. 18, 2013

(86) PCT No.: PCT/KR2013/009337
§ 371 (c)(1),
(2) Date: Nov. 20, 2015

(87) PCT Pub. No.: WO2014/189183
PCT Pub. Date: Nov. 27, 2014

(65) Prior Publication Data
US 2016/0102028 A1    Apr. 14, 2016

(30) Foreign Application Priority Data
May 24, 2013  (KR) .................. 10-2013-0059048

(51) Int. Cl.
*C05G 3/00*     (2006.01)
*C05B 7/00*     (2006.01)
(Continued)

(52) U.S. Cl.
CPC .............. *C05G 3/0047* (2013.01); *C05B 7/00* (2013.01); *C05C 3/005* (2013.01); *C05C 9/005* (2013.01);
(Continued)

(58) Field of Classification Search
None
See application file for complete search history.

(56) References Cited

U.S. PATENT DOCUMENTS 5,120,344 A * 6/1992 Libor .................. C05G 3/0047
106/900
6,076,299 A * 6/2000 Spittle .................... C09K 17/52
47/9

(Continued)

FOREIGN PATENT DOCUMENTS

CN    101857490    10/2010
JP    08-026875    1/1996
(Continued)

OTHER PUBLICATIONS

International Search Report and Written Opinion dated Feb. 24, 2014 for International Application No. PCT/KR2013/009337, Applicant, Leaders Chemical Co., Ltd. (4 pages).

*Primary Examiner* — Wayne A Langel
(74) *Attorney, Agent, or Firm* — McCracken & Gillen LLC

(57) ABSTRACT

Disclosed herein are matrix-type, controlled-release granular compound fertilizer and a method for preparing the same. The method comprises: mixing a natural or synthetic polymer as a binder with a nutrient-absorbent, bulking agent to give a mixture, and drying and pulverizing the mixture to afford a nutrient-absorbent supplement; and evenly blending the nutrient-absorbent supplement with a fertilizer ingredient and drying the blend.

10 Claims, 2 Drawing Sheets

(51) Int. Cl.
    *C05C 9/00*      (2006.01)
    *C05C 3/00*      (2006.01)
    *C05D 1/00*      (2006.01)
    *C05D 9/00*      (2006.01)

(52) U.S. Cl.
    CPC .............. *C05D 1/005* (2013.01); *C05D 9/00* (2013.01); *C05G 3/0058* (2013.01)

(56) References Cited

U.S. PATENT DOCUMENTS

| | | |
|---|---|---|
| 6,749,659 B1 | 6/2004 | Yu et al. |
| 7,252,697 B2 | 8/2007 | Liao et al. |
| 7,342,058 B2 * | 3/2008 | Peppmoller .............. C05D 9/00 524/13 |
| 8,562,710 B2 * | 10/2013 | Palmer .................... C05F 1/002 71/11 |
| 2002/0151621 A1 * | 10/2002 | Zakiewicz .......... C01B 17/0237 523/207 |
| 2003/0074940 A1 * | 4/2003 | Sexton .................... C05C 3/005 71/61 |
| 2003/0157247 A1 * | 8/2003 | Chikami ................ A01N 25/26 427/212 |
| 2003/0224031 A1 * | 12/2003 | Heier ..................... A01N 25/14 424/408 |
| 2007/0245786 A1 * | 10/2007 | Brosse ................. C05G 3/0029 71/27 |
| 2009/0242833 A1 * | 10/2009 | Chen ........................ C05D 9/02 252/194 |
| 2010/0075851 A1 * | 3/2010 | Mertens ................. A01N 25/10 504/101 |
| 2010/0139345 A1 * | 6/2010 | Burnham ................ C02F 11/14 71/6 |
| 2011/0077155 A1 * | 3/2011 | Goodwin ................ A01N 25/08 504/101 |
| 2011/0094967 A1 * | 4/2011 | Glienke ................ A01G 9/1086 210/660 |
| 2011/0230353 A1 * | 9/2011 | Anderson .............. A01N 25/12 504/320 |
| 2013/0039965 A1 * | 2/2013 | Fujii .................... C05G 3/0029 424/419 |

FOREIGN PATENT DOCUMENTS

| | | |
|---|---|---|
| JP | 2001-206802 | 7/2001 |
| KR | 10-0187473 | 4/1999 |
| KR | 10-2000-0002248 | 1/2000 |
| KR | 100850186 | 8/2008 |
| KR | 10-0893590 | 4/2009 |
| KR | 19960022408 | 12/2014 |

* cited by examiner

METHOD FOR MANUFACTURING SUSTAINED-RELEASE MATRIX-TYPE GRANULAR COMPLEX FERTILIZER AND MATRIX-TYPE GRANULAR COMPLEX FERTILIZER OBTAINED THEREFROM

BACKGROUND OF THE INVENTION

1. Field of the Invention

The present invention is a matrix-type, controlled-release compound fertilizer exhibiting high use efficiency, and a method for preparing the same. More particularly, the present invention relates to matrix-type, controlled-release granular compound fertilizer that employs a nutrient-absorbent bulking agent to retain fertilizer ingredients over a long period of time and to release the fertilizer ingredients in a controlled manner, unlike conventional coated forms, thereby enhancing the use efficiency of fertilizer by plants, with a minimum loss, and a method for preparing the same.

2. Description of the Related Art

In the agricultural field, various fertilizers including solid granular fertilizers, liquid fertilizers, immediate-release fertilizers, and slow-releasing fertilizers have been developed and applied. Inter alia, slow-releasing fertilizers in which particles of fertilizing ingredients are coated with a polymer are predominantly used. However, coated fertilizers are likely to remain for a long period of time in soil when the coat is not degraded. In addition, since coated fertilizers are prepared using an expensive facility, such as a fluidized bed coater, a drum coater, etc., they are expensive and thus are not widely utilized. Despite these disadvantages, coated fertilizers have recently attracted keen attention as labor-saving fertilizers, which serve to mitigate the declining number of farmers, because they are slowly dissolved over a long period of time to reduce the number of required applications.

Korean Patent Application Unexamined Publication No. 19960022408A suggests a method of slowing the dissolution rate of fertilizing ingredients in which a mixture of a resin and a fertilizer is extruded through an extruder to coat the fertilizing ingredients with the resin. However, the fertilizer is problematic in terms of commercialization because the method requires the use of a large amount of the expensive resin.

Korean Patent No. 10-0850186 discloses a fertilizer composition containing poly aspartic acid as potentiator for increasing the utilization efficiency of the fertilizer provided to plants, and a method for preparing fertilizer comprising the addition of polyaspartic acid in an amount of 0.1 to 10% to compound fertilizer so as to increase the utilization efficiency of the fertilizer. The compound fertilizer prepared by this method is observed to increase in utilization efficiency because polyaspartic acid suppresses the leaching of fertilizer ingredients. However, it does not enjoy a labor-saving effect since plants need an application of supplementary fertilizer thereto.

U.S. Pat. No. 6,749,659 introduces a matrix concept to delay the dissolution of ammonium sulfate in water wherein the matrix is composed of elemental sulfur and swelling clay. The fertilizer granule is prepared by blending a fertilizer material into a liquefied mixture of sulfur and swelling clay and granulating the blend. Dissolution rates of the fertilizer granule depend on granule sizes, with the rate of release of 1 to 2 mm particles doubling that of 2 to 4 mm particles. The mechanism of controlled release of this fertilizer seems to be electrostatic interaction between negatively charged clay and ammonium ions, thereby suppressing the release of fertilizer materials.

Chinese Patent No. 101857490A discloses a compound fertilizer capable of controlling release rates of fertilizing ingredients. The controlled-release compound fertilizer is prepared by spraying a liquefied mixture of a fertilizing ingredient and a swellable humectant clay, called attapulgite, from the top of a tower-type granulator. This method, although obtaining controlled release, is complex and requires investment for a new facility U. S. Pat. No. 7,252,697 B2 discloses a method for making controlled-release ammonium phosphate fertilizer. This method comprises mixing an ammonium phosphate slurry with a clay mineral such as zeolite, montmorillonite, etc.; acidifying the mixture with sulfuric acid; and granulating the acidified mixture. In this patent, however, there are no contents of controlled release, but only enhancement of the use efficiency of phosphate by preventing the fixation of phosphate in soil.

Leading to the present invention, intensive and thorough research into controlled-release compound fertilizer resulted in the finding that fertilizer, when prepared in a matrix-type granular form by combining a bulking agent showing high nutrient uptake with a binder to give a supplement, and evenly mixing the supplement with compound fertilizer, can be produced using a general production facility for compound fertilizer and that the matrix-type granular compound fertilizer can absorb and retain nutrients for a long period of time so that the absorbed nutrients are resistant to leaching in soil and runoff, thereby increasing the use efficiency of fertilizer by plants.

DOCUMENTS OF RELATED ART

Patent document 1: Korean Patent Application Unexamined Publication No. 19960022408 A
Patent document 2: Korean Patent No. 10-0850186
Patent document 3: U. S. Pat. No. 6,749,659B1
Patent document 4: CN 101857490A
Patent document 5: U. S. Pat. No. 7,252,697B2

SUMMARY OF THE INVENTION

It is therefore an object of the present invention to provide a method for preparing matrix-type, controlled-release granular compound fertilizer using a nutrient-absorbent bulking agent.

It is another object of the present invention to provide the matrix-type controlled-release granular compound fertilizer prepared by the method.

In accordance with an aspect thereof, the present invention provides a method for preparing matrix-type, controlled-release, granular compound fertilizer, comprising:

mixing a natural or synthetic polymer as a binder with a nutrient-absorbent bulking agent to give a mixture, and drying and pulverizing the mixture to afford a nutrient-absorbent supplement; and evenly blending the nutrient-absorbent supplement with a fertilizer ingredient and drying the blend.

For use in the method for the preparation of matrix-type, controlled-release granular compound fertilizer, the polymer is preferably composed of at least two selected from the group consisting of: polyacrylamide, polyvinylacetate, polyvinyl acetate copolymer (-ethylene), polyvinyl alcohol and a polyvinyl alcohol copolymer, ethyl cellulose, methyl cellulose, hydroxymethyl cellulose, hydroxypropyl cellulose, hydroxymethylpropyl cellulose, a carboxylic polymer, polyvinylpyrrolidone, dextrin, maltodextrin, polysaccharide, vinylidene chloride copolymer, starch, sodium lignosulfate, calcium lignosulfate, alginate, and polychloroprene; and the nutrient-absorbent bulking agent is preferably composed of at least two selected from the group consisting of: calcium bentonite, silica hydrogel, starch, a starch derivative, modified lignosulfonate, weathered coal, coal, active carbon, zeolite, attapulgite, magnesium hydrogen phosphate trihydrate, sodium magnesium silicate, synthetic calcium silicate, vermiculite, humus, acrylate copolymer, silicon dioxide, activated clay, aluminosilicate, and sodium aluminosilicate.

In a preferred embodiment, the nutrient-absorbent supplement contains the polymer in an amount of 0.1 to 50% by weight and the nutrient-absorbent bulking agent in an amount of 50 to 99.9% by weight, based on the total weight thereof. Further, the nutrient-absorbent bulking agent for use as a main component of the nutrient-absorbent supplement contains an inorganic bulking agent and an organic bulking agent with a weight ratio of 3:7 to 7:3 therebetween.

To give the nutrient-absorbent supplement, the mixture may be preferably dried at 80 to 100° C. for 20 min to 1 hr and the dried mixture is preferably pulverized into a size of 150 meshes or lower.

Subsequently, the nutrient-absorbent supplement is blended with a fertilizer ingredient. In this regard, the nutrient-absorbent supplement may be preferably used in an amount of 5 to 25% by weight, based on the weight of the fertilizer ingredient.

In a preferred embodiment, the method for preparing a matrix-type, granular compound fertilizer may comprise i) homogeneously blending the nutrient-absorbent supplement with a fertilizer ingredient; ii) granulating the blend in a granulator to give granules; and iii) drying the granules.

The granulator may be a drum granulator or a pan granulator. The drying step may preferably be conducted at 300 to 450° C. for 30 to 40 min.

In accordance with another aspect thereof, the present invention addresses matrix-type, controlled-release granular compound fertilizer prepared by a method comprising: mixing a natural or synthetic polymer as a binder with a nutrient-absorbent bulking agent to give a mixture, and drying and pulverizing the mixture to afford a nutrient-absorbent supplement; and evenly blending the nutrient-absorbent supplement with a fertilizer ingredient and drying the blend.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
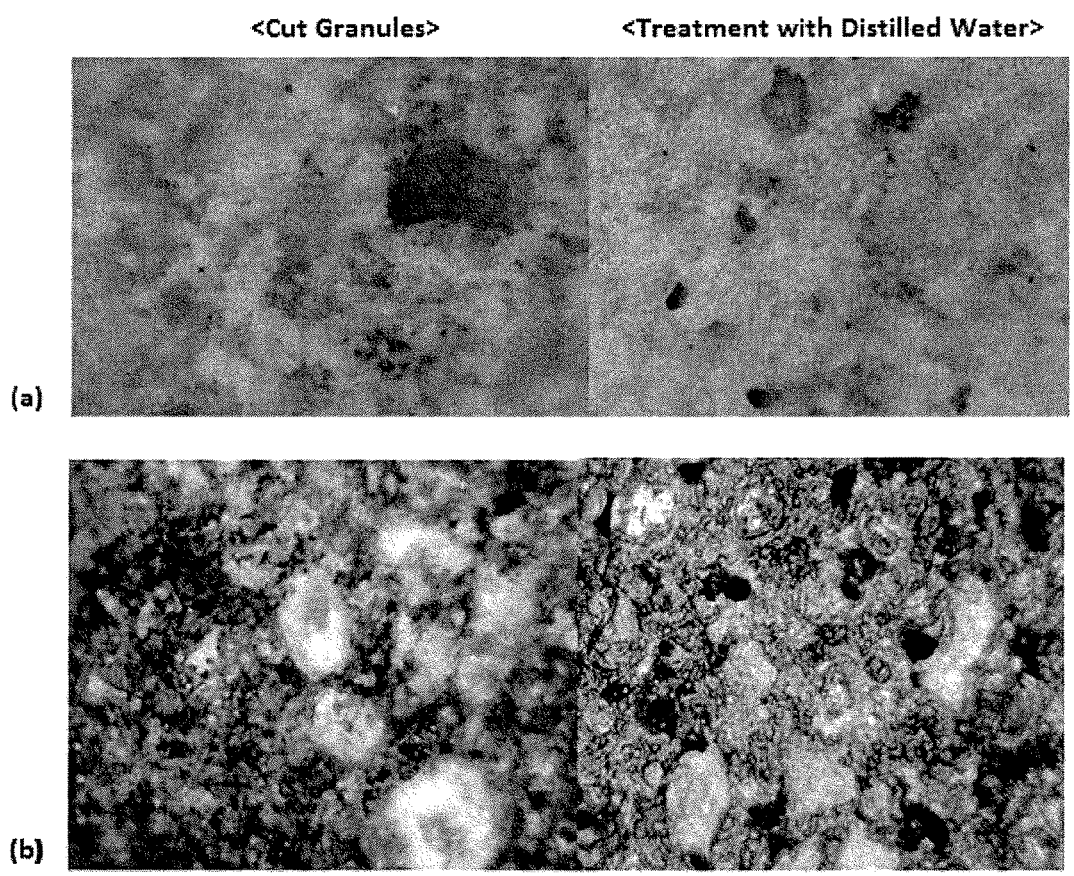
FIG. 1 shows optical images of cut granules of a general compound fertilizer (a) and the compound fertilizer (b) of the present invention before and after treatment with distilled water.

Below, a detailed description will be given of the present invention.

According to an aspect of the present invention there is provided a method for preparing a matrix-type, controlled-release granular compound fertilizer, comprising: mixing a natural or synthetic polymer as a binder with a nutrient-absorbent bulking agent to give a mixture, and drying and pulverizing the mixture to afford a nutrient-absorbent supplement; and evenly blending the nutrient-absorbent supplement with a fertilizer ingredient and drying the blend.

Each step is described in detail as follows.

(1) Preparation of Nutrient-Absorbent Supplement

To afford a nutrient-absorbent supplement, a natural or synthetic polymer as a binder is mixed with a nutrient-absorbent bulking agent, and then dried and pulverized.

Here, the natural or synthetic polymer serves to form, together with the nutrient-absorbent bulking agent, a matrix, and examples of the polymer include a combination of at least two selected from the group consisting of, but not limited to: polyacrylamide, polyvinylacetate, polyvinyl acetate copolymer (-ethylene), polyvinyl alcohol and a polyvinyl alcohol copolymer, ethyl cellulose, methyl cellulose, hydroxymethyl cellulose, hydroxypropyl cellulose, hydroxymethylpropyl cellulose, a carboxylic polymer, polyvinylpyrrolidone, dextrin, maltodextrin, polysaccharide, vinylidene chloride copolymer, starch, sodium lignosulfate, calcium lignosulfate, alginate, and polychloroprene.

In addition, the nutrient-absorbent, bulking agent may be inorganic and/or organic bulking agents, and preferably a mixture of inorganic and organic bulking agents. It is preferably composed of at least two selected from the group consisting of, but not limited to: calcium bentonite, silica hydrogel, starch, a starch derivative, modified lignosulfonate, weathered coal, coal, active carbon, zeolite, attapulgite, magnesium hydrogen phosphate trihydrate, sodium magnesium silicate, synthetic calcium silicate, vermiculite, humus, acrylate copolymer, silicon dioxide, activated clay, aluminosilicate, and sodium aluminosilicate.

Based on the total weight of the supplement, the polymer is contained in an amount of 0.1 to 50% by weight, preferably in an amount of 1 to 40% by weight, and most preferably in an amount of 10 to 20% by weight. The bulking agent is contained in an amount of 50 to 99.9% by weight, preferably in an amount of 60 to 99% by weight, and most preferably in an amount of 80 to 90% by weight, based on the total weight of the supplement.

When used in an amount less than 0.1% by weight, the polymer cannot play a sufficient role as a binder in granulating the fertilizer. On the other hand, an amount of the polymer exceeding 50% by weight may degrade nutrient absorption.

An inorganic bulking agent and an organic bulking agent may be used alone, but preferable is a combination of inorganic and organic bulking agents. In this context, an inorganic bulking agent may be preferably mixed at a weight ratio of 30:70 to 70:30 with an organic bulking agent, based on the total weight of the bulking agent.

In the preparation of the supplement, a mixture of the polymer and the bulking agent is dried at 80 to 100° C. for 20 min to 1 hr. Here, when the drying temperature is below 80° C., the raw materials are entangled during mixing and pulverizing processes because of abundant water. A drying temperature exceeding 100° C. may melt some of the mixture so that it may act as a binder to generate agglomerates. In addition, when the mixture is dried for less than 20 min, the subsequent blending process is difficult to perform because of a water content exceeding a proper level. More than 1 hour of drying may decrease thermal efficiency.

The dried, polymer and bulking agent mixture, that is, the supplement is pulverized into particles with a size of 150 meshes or less, preferably 100 meshes or less, and most preferably 80 meshes. After being pulverized to a predetermined size or less, the nutrient-absorbent supplement can be evenly distributed over compound fertilizer granules and thus can form a homogeneous matrix.

(2) Preparation of Compound Fertilizer with Nutrient-Absorbent Supplement

Next, the nutrient-absorbent supplement and a fertilizer ingredient are evenly blended, and dried to obtain the matrix-type, granular compound fertilizer. In this step, the supplement is evenly blended with a fertilizer ingredient, and the blend is granulated using a drum or pan granulator, followed by drying the granules at 300 to 450° C. for 30 to 40 min to form an intragranular microcapsule-type matrix.

To give a homogeneous blend, stirring is carried out at 50 to 100 rpm for 4 to 10 min. Here, the nutrient-absorbent supplement may be preferably blended in an amount of 5 to 25% by weight, based on the total weight of the fertilizer ingredient. When the supplement is used in an amount less than 5% by weight, an intergranular matrix may be difficult to form. More than 25% by weight of the supplement may not allow the nutrient to be released to the degree necessary for the early growth stage of plants, inhibiting plant growth.

Subsequently, the homogeneous blend of the supplement and the fertilizer ingredient is granulated. Here, the granulation may be preferably conducted using a drum or pan granulator.

During granulation, steam or water is sprayed so that the polymer and the fertilizer ingredient are dissolved, serving as a binder. By hot air after the granulation, a polymer matrix is formed within granules, with a consequent increase in fineness modulus and hardness.

During the granulation, the inorganic and organic bulking agents and the polymer within the supplement form a matrix in a network structure, increasing resistance to impact during packaging and transportation.

The granulated particles are dried at 300 to 450° C. for 30 to 40 min to form an intragranular microcapsule-type matrix. Here, when dried at less than 300° C., the compound fertilizer granules may be prone to undergoing water damage and compaction due to their high water content. On the other hand, drying at higher than 450° C. may carbonize the organic bulking agent including the polymer to lower nutrient absorption.

Finally, the matrix-type, controlled-release, granular compound fertilizer is cooled, selected and packaged.

When applied to soil, the matrix-type, controlled-release granular compound fertilizer absorbs water and dissolves. The dissolved fertilizer ingredient is absorbed by and retained within the absorbent organic and inorganic bulking agents by electrostatic attraction. In addition, the fertilizer ingredients permeate soil pores as the fertilizer granules absorb water and collapse due to the nutrient absorption (electrostatic attraction) and water retention capacity of the polymer itself. Interaction of soil-fertilizer-bulking agent-polymer allows for the formation of a microcapsular matrix.

Typical fertilizer ingredients in this art may be available in the present invention. Examples of the fertilizer ingredient useful in the present invention include, but are not limited to: urea, ammonium sulfate, ammonium phosphate, potassium chloride, and siliceous.

A matrix-type, controlled-release granular fertilizer can be prepared in a single process where supplement preparation and compound fertilizer preparation are not divided clearly, as well as by the above-mentioned method.

Further, in order to meet nutrient requirements by plant, the controlled-release granular compound fertilizer may be blended with coated fertilizer having a certain dissolution time.

Furthermore, in order to more accurately meet nutrient requirements by plant, the controlled-release granular compound fertilizer may be blended with coated fertilizer having a certain dissolution time, and a microorganism having the ability to fix nitrogen and to dissolve phosphoric acid and potassium.

A better understanding of the present invention may be obtained through the following examples which are set forth to illustrate, but are not to be construed as limiting the present invention.

Preparation Example 1

Preparation of Nutrient-Absorbent Supplement

A mixture of 50% by weight of an inorganic bulking agent (vermiculite) and 40% by weight of an organic bulking agent (humus) was homogeneously combined with a 4.9% by weight of sodium lignosulfonate, 0.1% by weight of polyacrylamide, and 5% by weight of hydroxypropylmethyl cellulose at 50 rpm for 10 min. The resulting mixture was dried at about 90° C. for 40 min, followed by pulverization into granules with a size of 80 meshes or less.

Example 1

Preparation of Matrix-Type, Controlled-Release Granular Compound Fertilizer

10% by weight of the nutrient-absorbent supplement obtained in Preparation Example 1 was blended with 10% by weight of urea, 40% by weight of ammonium sulfate, 14% by weight of ammonium phosphate, 12% by weight of potassium chloride, and 14% by weight of siliceous, and the blend was granulated using a pan granulator. Subsequently, the granules were dried at 400° C. for 30 min to form granular compound fertilizer with an intragranular microcapsule-type matrix.

Example 2

10% by weight of the nutrient-absorbent supplement obtained in Preparation Example 1 was blended with 18% by weight of urea, 37% by weight of ammonium sulfate, 14% by weight of ammonium phosphate, 14% by weight of potassium chloride, and 7% by weight of siliceous, and the blend was granulated using a pan granulator. Subsequently, the granules were dried at 400° C. for 30 min to form granular compound fertilizer with an intragranular microcapsule-type matrix.

Comparative Example 1

Preparation of General Compound Fertilizer

10% by weight of bentonite, 18% by weight of urea, 37% by weight of ammonium sulfate, 14% by weight of ammonium phosphate, 14% by weight of potassium chloride, and 7% by weight of siliceous were blended, and granulated using a pan granulator to afford a compound fertilizer.

Test Example 1

Granules of both the compound fertilizer prepared in Example 1 (polymer+inorganic bulking agent+organic bulking agent+fertilizer) and the general compound fertilizer of Comparative Example 1 (bulking agent+fertilizer) were examined for binding state therebetween before and after treatment with distilled water, and were observed under an optical microscope (Nikon Eclipse 50i, ×2000). Images are given in FIGS. 1 and 2.

Figure 2:
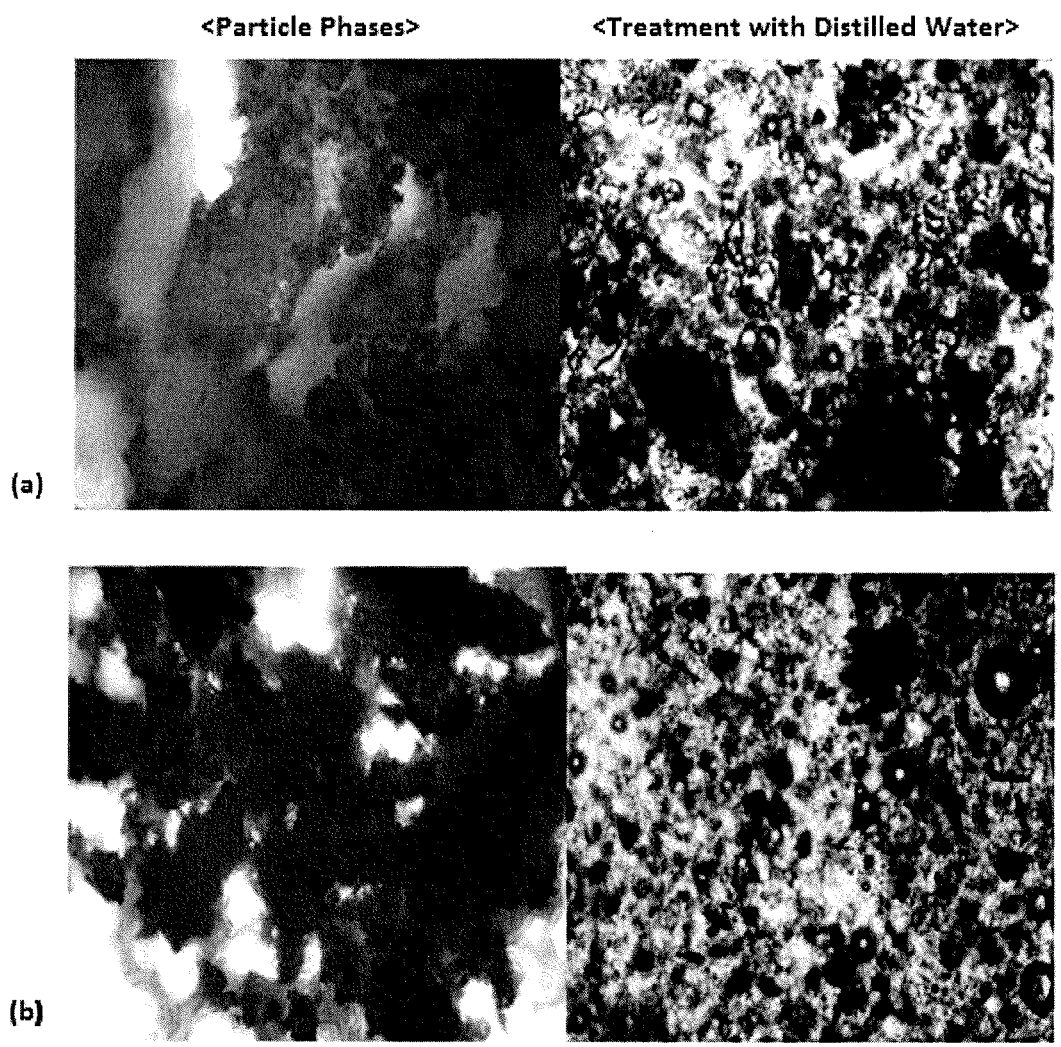
FIG. 2 shows optical images of particle phases of a general compound fertilizer (a) and the compound fertilizer (b) of the present invention before and after treatment with distilled water.

FIG. 1 shows cut granules of a general compound fertilizer (a) and the compound fertilizer (b) of the present invention before and after treatment with distilled water. FIG. 2 shows particle phases of a general compound fertilizer (a) and the compound fertilizer (b) of the present invention before and after treatment with distilled water.

As can be seen in FIGS. 1 and 2, a network is formed in the granules of the compound fertilizer of the present invention.

Test Example 2

Comparison of Leaching Suppression

The matrix-type granular compound fertilizer of Example 1 and the general compound fertilizer of Comparative Example 1 were assayed for leaching suppression ability, and the results are given in Table 1, below.

Assay for leaching suppression ability: In a cylindrical column long 13.5 cm with a diameter of 2.6 cm, three sheets of No. 2 filter paper were placed on the bottom and 10 g of sand was then loaded thereto. Again, one sheet of No. 2 filter paper was laid on the sand, followed by loading a mixture of 30 g of soil and a fertilizer sample of Example 1 or Comparative Example 1 (0.5 g and 1 g each) to the sand. Subsequently, one sheet of No. 2 filter paper was placed on the mixture, and 60 ml of water was slowly added from the top. When water reached a cork portion, the column was fastened with the cork. After 12 hrs, the cork was opened and the time taken for the fertilizer to leach to the soil layers was measured.

TABLE 1

|  | Soil | Ex. 1 | | C. Ex. 1 | |
| --- | --- | --- | --- | --- | --- |
|  |  | 0.5 g | 1 g | 0.5 g | 1 g |
| Leaching time (min) | 100 | 290 | 6,480 | 180 | 660 |
| Leaching suppression % relative to non-treated control | 0 | 190 | 6,380 | 80 | 560 |
| Leaching suppression % relative to general compound fertilizer |  | 61.1 | 881.8 |  |  |

From the data of Table 1, it is understood that the leaching suppression potential of the matrix-type granular compound fertilizer according to the present invention is far superior to that of the general compound fertilizer.

Test Example 3

Effect of Matrix-Type, Controlled-Release Granular Compound Fertilizer on Plant Growth 1. Material and Method Main Materials:
  Example 1—matrix-type, controlled-release granular compound fertilizer
  Example 2—matrix-type, controlled-release granular compound fertilizer
  Comparative Example 1—Conventional slow-releasing fertilizer
  Test plant: rice (cultivar: Akibare)
  Test method: compound fertilizers of Examples 1 and 2 were applied to soil 4 days before transplantation, and the soil was overturned using a rotary tiller so that the fertilizers were evenly distributed in the soil. The amount of applied fertilizer was, on the basis of 10a, 73.3 kg for Example 1, 61.1 kg for Example 2, and 61.1 kg for Comparative Example 1. The predetermined amounts of fertilizers were applied once before transplantation. Growth was examined twice by growth stage.

Measurement was made of plant height, number of tillers, and leaf color (SPAD value), and cultivation was conducted according to the standard cultural practices for rice of the Korean Rural Development Administration.

2. Result

Overall plant growth was evaluated in terms of plant height, leaf color, and number of tillers on day 30 and 60 after the application of the compound fertilizers of Examples 1 and 2 and the conventional slow-releasing fertilizer of Comparative Example 1, and the results are summarized in Table 2, below. As is understood from the data of Table 2, comparable results of plant height, leaf color and number of tillers were detected between the fertilizers of Examples and Comparative Example 1. Further, the fertilizers of Examples 1 and 2 were found to have continuously maintained their fertilizing effect even when predetermined amounts of them were applied at once as a base fertilizer.

TABLE 2

| | | Item | | | | | | | |
| --- | --- | --- | --- | --- | --- | --- | --- | --- | --- |
| | | Day 30 after transplantation | | | | Day 60 after transplantation | | | |
| | | No Fertilizer | C. Ex. 1 | Ex. 1 | Ex. 2 | No Fertilizer | C. Ex. 1 | Ex. 1 | Ex. 2 |
| | Round | | | Amount of applied fertilizer (/10a) | | | | | |
| | No. | 0 kg | 61.1 kg | 73.3 kg | 61.1 kg | 0 kg | 61.1 kg | 73.3 kg | 61.1 g |
| Plant | 1 | 31.1 | 35.5 | 36.1 | 36.4 | 61.2 | 70.5 | 69.8 | 73.5 |
| Height | 2 | 29.5 | 36.5 | 35.3 | 36.1 | 62.5 | 72.6 | 73.2 | 70.6 |
| (cm) | 3 | 32.5 | 36.1 | 35.6 | 35.7 | 62.8 | 73.5 | 71.2 | 71.5 |
| | Avg. | 31.0 | 36.0 | 35.7 | 36.1 | 62.2 | 72.2 | 71.4 | 71.9 |

TABLE 2-continued

| | | \multicolumn{4}{c}{Day 30 after transplantation} | \multicolumn{4}{c}{Day 60 after transplantation} |
|---|---|---|---|---|---|---|---|---|---|
| | Round | No Fertilizer | C. Ex. 1 | Ex. 1 | Ex. 2 | No Fertilizer | C. Ex. 1 | Ex. 1 | Ex. 2 |
| | | \multicolumn{8}{c}{Amount of applied fertilizer (/10a)} |
| | No. | 0 kg | 61.1 kg | 73.3 kg | 61.1 kg | 0 kg | 61.1 kg | 73.3 kg | 61.1 g |
| Leaf color SPAD value | 1 | 27.5 | 40.5 | 40.8 | 42.6 | 23.4 | 33.5 | 32.9 | 33.5 |
| | 2 | 26.7 | 41.8 | 41.6 | 42.1 | 22.1 | 34.6 | 35.1 | 34.1 |
| | 3 | 25.6 | 42.1 | 42.5 | 42.7 | 21.5 | 34.1 | 34.8 | 34.2 |
| | Avg. | 26.6 | 41.5 | 41.6 | 42.5 | 22.3 | 34.1 | 34.3 | 33.9 |
| No of Tillers (ea.) | 1 | 14 | 20 | 23 | 22 | 12 | 21 | 22 | 20 |
| | 2 | 13 | 22 | 22 | 20 | 13 | 20 | 20 | 19 |
| | 3 | 13 | 21 | 21 | 22 | 12 | 20 | 21 | 22 |
| | Avg. | 13.3 | 21.0 | 22.0 | 21.3 | 12.3 | 20.3 | 21.0 | 20.3 |

Test Example 4

Effect of Matrix-Type, Controlled-Release Granular Compound Fertilizer on Pepper Plant Growth 1. Material and Method Main Materials:

Example 1—matrix-type, controlled-release granular compound fertilizer

Example 2—matrix-type, controlled-release granular compound fertilizer

Comparative Example 1—Conventional slow-releasing fertilizer

Test plant: pepper (cultivar: Buchon)

Test method: compound fertilizers of Examples 1 and 2 were applied to soil 7 days before transplantation and the soil was overturned using a rotary tiller so that the fertilizers were evenly distributed in the soil. The amount of applied fertilizer was, on the basis of 10a, 126.63 kg for Example 1, 105.5 kg for Example 2, and 105.5 kg for Comparative Example 1. The predetermined amounts of fertilizers were applied once before transplantation. Growth was examined three times by growth stage, and the fruits were counted finally upon harvest.

Measurement was made of plant height, leaf color (SPAD value), yield per area, and cultivation was conducted according to the standard cultural practices for pepper of the Korean Rural Development Administration.

2. Result

Overall plant growth was evaluated in terms of plant height and leaf color on day 10 and 20 after the application of the compound fertilizers of Examples 1 and 2 and the conventional slow-releasing fertilizer of Comparative Example 1, and the results are summarized in Table 3, below. As is understood from the data of Table 3, the fertilizers of Examples 1 and 2 guaranteed superiority in plant height and leaf color, compared to that of Comparative Example 1, and with the highest total yield of pepper fruits was obtained with the fertilizer of Example 2. Further, the fertilizers of Examples 1 and 2 were found to continuously maintain their fertilizing effect even when predetermined amounts were applied at once as a base fertilizer.

TABLE 3

| | | \multicolumn{4}{c}{Plant Height (cm)} | \multicolumn{4}{c}{Leaf Color (SPAD value)} |
|---|---|---|---|---|---|---|---|---|---|
| | Round | No fertilizer | C. Ex. 1 | Ex. 1 | Ex. 2 | No fertilizer | C. Ex. 1 | Ex. 1 | Ex. 2 |
| | | \multicolumn{8}{c}{Amount of Applied Fertilizer (/10a)} |
| | No. | 0 kg | 105.5 kg | 126.6 kg | 105.5 kg | 0 kg | 105.5 kg | 126.6 kg | 105.5 kg |
| 10 Days after Transplantation | 1 | 13.2 | 16.2 | 17.8 | 17.1 | 28.5 | 45.7 | 47.5 | 47.5 |
| | 2 | 12.5 | 15.9 | 18.2 | 17.6 | 29.4 | 46.5 | 46.7 | 47.1 |
| | 3 | 12.8 | 15.3 | 18.1 | 17.3 | 28.4 | 46.1 | 46.4 | 47.3 |
| | Avg. | 12.8 | 15.8 | 18.0 | 17.3 | 28.8 | 46.1 | 46.9 | 47.3 |
| 20 Days After Transplantation | 1 | 18.5 | 24.5 | 23.8 | 24.1 | 38.5 | 63.2 | 67.1 | 67.1 |
| | 2 | 17.4 | 23.2 | 23.7 | 22.1 | 38.1 | 62.1 | 65.4 | 66.7 |
| | 3 | 17.5 | 23.9 | 22.5 | 23.8 | 37.2 | 61.4 | 66.6 | 66.9 |
| | Avg. | 17.8 | 23.9 | 23.3 | 23.3 | 37.9 | 62.2 | 66.4 | 66.9 |
| 30 Days After Transplantation | 1 | 31.2 | 36.8 | 35.7 | 37.5 | 39.4 | 66.7 | 69.4 | 71.1 |
| | 2 | 32.4 | 37.1 | 37.2 | 37.1 | 40.1 | 66.4 | 71.4 | 69.5 |
| | 3 | 31.6 | 37.4 | 37.3 | 36.5 | 41.8 | 66.5 | 71.4 | 70.1 |
| | Avg. | 31.7 | 37.1 | 36.7 | 37.0 | 40.4 | 66.5 | 70.7 | 70.2 |

TABLE 4

| Item | Round No | No fertilizer | C. Ex. 1 | Ex. 1 | Ex. 2 |
|---|---|---|---|---|---|
| Amount of applied fertilizer (/10a) | | 0 kg | 105.5 kg | 126.6 kg | 105.5 kg |
| Fresh weight of red pepper (kg/30 m$^2$) | 1 | 4.1 | 8.4 | 6.2 | 7.5 |
| | 2 | 3.8 | 6.3 | 6.2 | 7.0 |
| | 3 | 4.7 | 7.2 | 9.0 | 9.5 |
| | Total | 12.6 | 21.9 | 21.4 | 24.0 |

Because the compound fertilizer according to the present invention retains nutrients therein, without loss even after application to soil, no additional applications are needed during the overall growth period of plants, which is helpful in reducing work in areas with a shortage of farm labor. In addition, it's possible to apply the compound fertilizer to sideland placement and thus makes a contribution to farm mechanization.

Conventional controlled-release, polymer-coated fertilizer or chemically controlled-release fertilizer, such as UF, CDU and IBDU, imparts a great economic burden to consumers because it requires a complex process for preparation thereof, and employs expensive raw materials. In contrast, the controlled-release fertilizer enjoys the advantage of being supplied at a low cost, not only because its preparation process is simple enough to employ general production processes of fertilizer, but also because its raw materials are cheap.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for preparing matrix-type, controlled-release granular compound fertilizer, consisting essentially of:
    mixing a natural or synthetic polymer as a binder with a nutrient-absorbent bulking agent to give a mixture, wherein the polymer is composed of at least two polymers selected from the group consisting of: polyacrylamide, polyvinylacetate, polyvinyl acetate copolymer (-ethylene), polyvinyl alcohol and a polyvinyl alcohol copolymer, ethyl cellulose, methyl cellulose, hydroxymethyl cellulose, hydroxypropyl cellulose, hydroxymethylpropyl cellulose, a carboxylic polymer, polyvinylpyrrolidone, dextrin, maltodextrin, polysaccharide, vinylidene chloride copolymer, starch, sodium lignosulfate, calcium lignosulfate, alginate, and polychloroprene, and wherein the nutrient-absorbent bulking agent is composed of at least two bulking agents selected from the group consisting of calcium bentonite, silica hydrogel, starch, a starch derivative, modified lignosulfonate, weathered coal, coal, active carbon, zeolite, attapulgite, magnesium hydrogen phosphate trihydrate, sodium magnesium silicate, synthetic calcium silicate, vermiculite, humus, acrylate copolymer, silicon dioxide, activated clay, aluminosilicate, and sodium aluminosilicate, and drying and pulverizing the mixture to afford a nutrient-absorbent supplement; and
    homogeneously blending the nutrient-absorbent supplement with a fertilizer ingredient, granulating the blend in a granulator to form granules, and drying the granules, wherein the drying is conducted at 300 to 450 degrees Celsius for 30 to 40 minutes.

2. The method of claim 1, wherein the nutrient-absorbent supplement contains the polymer in an amount of 0.1 to 50% by weight, and the bulking agent in an amount of 50 to 99.9% by weight, based on a total weight thereof.

3. The method of claim 1, wherein the nutrient-absorbent bulking agent comprises a mixture of an inorganic bulking agent at a weight ratio of 3:7 to 7:3 with an organic bulking agent.

4. The method of claim 1, wherein the mixture for the supplement is dried for 20 min to 1 hr at 80 to 100° C.

5. The method of claim 1, wherein the mixture is pulverized into particles with a size of 150 meshes or less.

6. The method of claim 1, wherein the nutrient-absorbent supplement is blended in an amount of 5 to 25% by weight, based on a total weight of the fertilizer ingredient.

7. The method of claim 1, wherein the fertilizer ingredient is selected from the group consisting of: urea, ammonium sulfate, ammonium phosphate, potassium chloride and siliceous fertilizer.

8. A method for preparing a matrix-type, granular compound fertilizer, comprising:
    i) homogeneously blending the nutrient-absorbent supplement of claim 1 with a fertilizer ingredient;
    ii) granulating the blend in a granulator to give granules; and
    iii) drying the granules, wherein the drying is conducted at 300 to 450 degrees Celsius for 30 to 40 minutes.

9. The method of claim 8, wherein the granulator is a drum granulator or a pan granulator.

10. A matrix-type, controlled-release granular compound fertilizer, prepared using the method of claim 1.

* * * * *